United States Patent
Neumann

(10) Patent No.: US 6,401,020 B1
(45) Date of Patent: Jun. 4, 2002

(54) PROCESS AND DEVICE FOR CONTROLLING HEADLIGHT RANGE OF A MOTOR VEHICLE

(75) Inventor: Andreas Neumann, Lippstadt (DE)

(73) Assignee: Hella KG Hueck & Co., Lippstadt (DE)

(*) Notice: Subject to any disclaimer, the term of this patent is extended or adjusted under 35 U.S.C. 154(b) by 0 days.

(21) Appl. No.: 09/644,903

(22) Filed: Aug. 24, 2000

(30) Foreign Application Priority Data

Aug. 24, 1999 (DE) .......................... 199 40 098

(51) Int. Cl.[7] .............................. B60Q 1/08
(52) U.S. Cl. .................. 701/49; 701/80; 307/10.8; 73/105
(58) Field of Search .............. 701/36, 49, 80; 315/80, 82; 307/10.1, 10.8; 362/71, 277, 285, 286, 428; 73/105

(56) References Cited

U.S. PATENT DOCUMENTS

| | | | | |
|---|---|---|---|---|
| 5,191,530 A | * | 3/1993 | Hussmann et al. | 701/49 |
| 5,787,370 A | * | 7/1998 | Kutscher et al. | 701/49 |
| 6,049,749 A | * | 4/2000 | Kobayashi | 701/49 |
| 6,229,263 B1 | * | 5/2001 | Izawa | 315/80 |

FOREIGN PATENT DOCUMENTS

| | | |
|---|---|---|
| DE | A1-4024916 | 2/1992 |
| DE | A1-4202908 | 8/1993 |
| DE | A1-19653662 | 11/1997 |
| DE | A1-19703665 | 11/1997 |

\* cited by examiner

Primary Examiner—Gary Chin
(74) Attorney, Agent, or Firm—Birch, Stewart, Kolasch & Birch

(57) ABSTRACT

Device for control of headlight range of a motor vehicle including a front axle transmitter (1) and a rear axle transmitter (2), which generate signals depending on a position of a vehicle chassis relative to a front axle and a rear axle of the vehicle, wherein the device further includes adjustment devices (14, 15), which can adjust the headlight range of the motor vehicle depending on these signals. The device further includes a speed transmitter (3) and a terrain recognition unit (24), with the terrain recognition unit (24) being connected to the front axle transmitter (1), the rear axle transmitter (2), and the speed transmitter (3). The terrain recognition unit can calculate and store a difference between the signals from the front axle transmitter (1) and the rear axle transmitter (2), subtract a previously calculated difference in the signals, divide the signal obtained by this subtraction by a signal corresponding to the speed of the vehicle, and compare the signal obtained by this division with a predetermined threshold value. The terrain recognition unit (24) decides that a poor road surface is present when the threshold value is exceeded, and possibly deactivates control of the headlight range.

15 Claims, 2 Drawing Sheets

PROCESS AND DEVICE FOR CONTROLLING HEADLIGHT RANGE OF A MOTOR VEHICLE

BACKGROUND OF THE INVENTION

This application claims a priority based on German application 199 40 098.9 filed on Aug. 24, 1999, and the contents of that application are incorporated herein by reference.

The present invention concerns a process for controlling headlight range of a motor vehicle wherein signals are measured at front and rear axles representative of a position of a vehicle chassis of the motor vehicle relative to the front and rear axles and a signal corresponding to the speed of the motor vehicle is further generated, with the signals measured at the front and rear axles as well as the signal corresponding to the speed of the motor vehicle being further processed for allowing recognition of presence of a poor road surface. This invention also includes a device for carrying out this process.

When a motor vehicle with a headlight range control travels on a poor road surface, which is usually characterized by irregularly arranged unevenness, malfunctions of an automatic headlight range control may occur. There exists, for example, the possibility that, with sensors arranged on front and rear axles for determining height or inclination of the motor vehicle, shakes of a chassis could be interpreted as rotary motions around a pitch axis such that the device for headlight range control sets inappropriate headlight ranges; which could result, for example, in blinding opposing traffic.

A process, as well as a device for performing the process, of the type mentioned in the introductory paragraph above are disclosed in German patent publication, Offenlegungsschrift DE 196 53 662 A1. With the device described therein, vehicle height sensors are provided, for example, which detect changes in vehicle height near right front and left rear wheels of a vehicle. A terrain recognition unit according to the aforementioned German publication compares temporal courses of output signals of these two vehicle height sensors with each other, with the output signal of the vehicle height sensor at the rear axle being provided with a speed-dependent temporal offset in order to detect a correlation between the signals. The aforementioned device accurately makes a positive decision regarding recognition of a poor road surface when no correlation between the two signals thus compared with each other exists for a predetermined measurement period or when this correlation is relatively small. If the terrain recognition unit notes a clearly defined correlation between the two signals thus compared with each other, it decides that no poor road surface is present. In the event of a positive decision with regard to the presence of a poor road surface, the terrain recognition unit causes an adjustment device to adjust the headlight range to a certain predetermined value. After leaving the poor road surface, the headlight range control is again released.

It has proven disadvantageous with the aforementioned device and the process performed thereby that a relatively complicated comparison procedure with regard to the correlation of the signals of the front and a rear vehicle height sensors must be performed. Moreover, in this known device, the vehicle height sensors must be arranged on different sides of the vehicle.

It is an object of this invention to create a process and a device to control a headlight range of a motor vehicle of the type mentioned in the introduction above, which can be carried out in an uncomplicated manner and which has an uncomplicated structure, respectively.

SUMMARY OF THE INVENTION

According to principles of this invention, a difference between measured signals at a first point in time on a front axle and a rear axle is calculated and stored. Then, a difference between the measured signals at the front and rear axles is calculated at a second, later, point in time. Then, the two aforementioned differences are subtracted from each other, with a signal obtained being divided by a signal corresponding to a speed of the motor vehicle. If the signal obtained through this division exceeds a predetermined threshold value, a decision is made by a terrain recognition unit that a poor road surface is present. By means of the aforementioned calculations of differences, repeated at regular temporal interval, for example, and the subsequent division, the signals measured at the front and rear axles of the motor vehicle are evaluated in a simple and effective manner relative to vehicle speed.

When a front axle transmitter and a rear axle transmitter issue signals from vehicle height sensors, for example, the difference between the two signals delivers a statement concerning an inclination of the vehicle in a direction of travel, that is of a pitch angle. By calculating a difference between two of the differences between these signals taken at a predetermined time-interval spacing, the temporal change in the inclination of the vehicle is thus determined. By dividing with a signal corresponding to the speed of the vehicle, it is guaranteed that a positive decision with regard to presence of a poor road surface is made only, if even in slow travel, the inclination of the vehicle changes significantly in the direction of travel within a relatively short period of time. If, in contrast, the vehicle is moving at a high speed on a street which has continuous, but yet significant, changing road-bed inclinations in the direction of travel, such as is, for example, the case at a rounded top of a hill, no positive decision is made recognizing a poor road surface, so that the headlight range control remains in operation.

In an enhanced process, the signals measured, for example, on the front axle and on the rear axle by an enhanced device of this invention can in each case be multiplied by a characteristic factor which takes into account respective characteristics of the sensors detecting the signals. The difference between the signals measured at a first point in time on the front and rear axles and multiplied by the respective characteristics is calculated and stored. From this difference, a difference of signals measured on the front and rear axles at a second, later, point in time and multiplied by the respective characteristic factors can be calculated. As in the basic process, in this enhanced process as well, the signal obtained in the previous process step is divided by a signal corresponding to the speed of the motor vehicle and accordingly compared with a threshold value to decide whether a poor road surface is present. It has proven advantageous that in signals multiplied by the characteristic factor, the dependencies of the signals on the respective axle sensor kinematics have already been taken into account.

Advantageously, in the calculation of the difference of the signals multiplied by the respective characteristic factors, an offset value may be added such that the output signal thus obtained can be used as a desired-value signal for the headlight range control.

In the two aforementioned alternative embodiments of the process according to the invention, the process steps of difference calculation, division, and comparison with the predetermined threshold value may be repeated at regular or speed-dependent time intervals.

According to a preferred embodiment of the present invention, the possibility exists, in the presence of a positive decision relative to recognition of a poor road surface, to adjust the headlight range of the motor vehicle to a predetermined value, which preferably corresponds to a value in a normal position of the motor vehicle. Alternatively, in the presence of a positive decision relative to recognition of a poor road surface, the headlight range of the motor vehicle can be kept constant at the value existing at the time of the decision. With both processes, it is avoided that the headlight range is adjusted as a function of frequently changing inclination of the vehicle on a poor road surface.

According to a preferred embodiment of the present invention, the signal obtained upon division by the signal corresponding to the speed of the motor vehicle is filtered by a preferably digital lowpass filter before comparison with the predetermined threshold value. By use of this lowpass filter, high frequency components of the signal, which are generated, for example, by vibrations of the vehicle, are suppressed.

Advantageously, in the presence of a positive decision of recognition of a poor road surface, a counter is set to a predetermined initial value, whereby after the presence of a negative decision relative to the recognition of a poor road surface, when the value drops below the predetermined threshold value, the counter set to the predetermined initial value is counted, or resets downwardly at predetermined time intervals, with the headlight range control remaining deactivated as long as the counter has a value other than zero or greater than a predetermined lower threshold value. The downward counting of the counter can preferably be designed to be speed-dependent such that with each counting procedure a value corresponding to the speed of the motor vehicle is subtracted from the counter value. Thus, after leaving the poor road surface, the headlight range control is switched on again after a period of time which is dependent on the speed of the motor vehicle. Thus, if the motor vehicle moves away from the poor road surface at a relatively high speed, the headlight range control is already available again after a short time such that the headlight range can be adapted to driving conditions.

BRIEF DESCRIPTION OF THE DRAWINGS

Additional advantages and features of this invention are made clear by the following description of preferred exemplary embodiments with reference to the accompanying drawings. They depict.

DESCRIPTION OF THE PREFERRED EMBODIMENT

Figure 1:
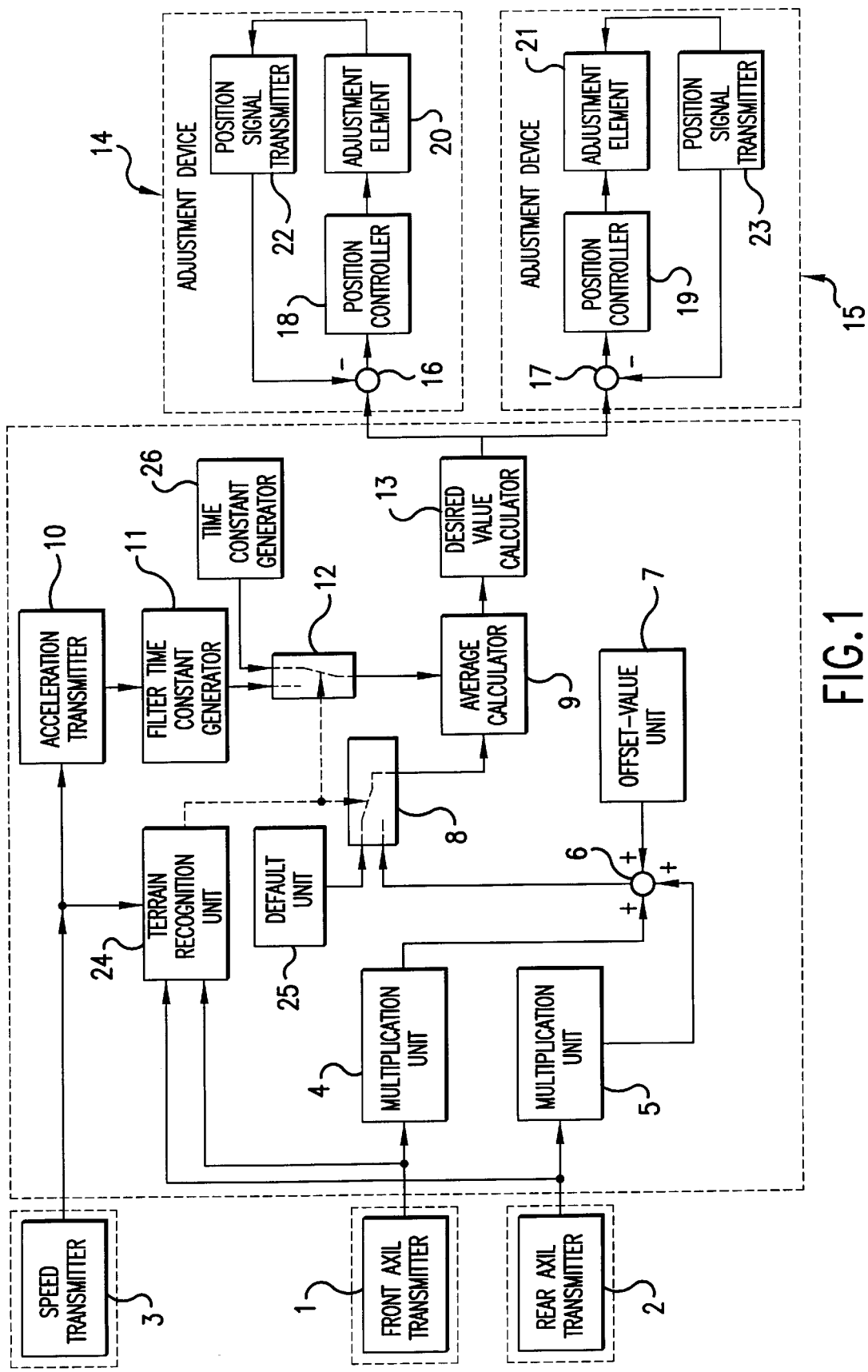
FIG. 1 is a block circuit diagram of an embodiment of a device of this invention.

Reference first is made to FIG. 1. The device depicted therein includes a front axle transmitter 1 and a rear axle transmitter 2, which can generate in each case signals depending on a position of a vehicle chassis relative to a front axle or a rear axle, respectively. In addition, the device depicted in FIG. 1 includes a speed transmitter 3, which can issue a signal corresponding to a speed of the vehicle.

The signals issued by the front axle transmitter 1 and the rear axle transmitter 2 are fed to two multiplication emits 4, 5, in which the signals of the front axle transmitter 1 and the rear axle transmitter 2, respectively, are multiplied by a characteristic factor, which in each case takes into account the associated characteristics of the signal-detecting sensor in the region of the front and rear axles, respectively. The signals issued by the multiplication units 4, 5 are brought together in a difference calculator 6, wherein additionally an offset value predetermined by an offset-value unit 7 is also added thereto. The signal issued by the difference calculator 6 is suitable for control of adjustment devices described in detail in the following.

The signal issued by the difference calculator 6 can be input via a switching element 8 into an average calculator 9. The average calculator 9 makes it possible to drive the adjustment devices with a new constant setting signal only after a predetermined variable filter time constant, whereby service lives of the adjustment devices or the adjustment elements included therein, to be described in the following, are increased. For a determination of a filter time constant, the signal issued by the speed transmitter 3 is input into an acceleration transmitter 10, with an output signal of the acceleration transmitter 10 being fed to a filter time constant generator 11. The filter time constant generated by the filter time constant generator 11 is fed via a switching element 12 to the average calculator 9.

An output signal of the average calculator 9 is fed to a desired-value calculator 13, which feeds a corresponding desired value to each of two adjustment devices 14, 15. The adjustment devices 14, 15 include in each case a subtracter 16, 17, a position controller 18, 19 connected with each of these, as well as, in each case, an adjustment element 20, 21, for adjustment of a headlight range of a headlight of a motor vehicle connected therewith, for example. Moreover, each of the adjustment devices 14, 15 includes a position signal transmitter 22, 23 which can send feedback concerning a current position of the adjustment device to the subtracter 16, 17. Such adjustment devices 14, 15 with an upstream average calculator 9 are known, for example, from EP 0 355 539 B1.

The embodiment of the present invention depicted in FIG. 1 further includes a terrain recognition unit 24, to which the signals of the front axle transmitter 1, the rear axle transmitter 2, and the speed transmitter 3 may be fed. For the case that the terrain recognition unit 24 makes a decision that the motor vehicle is on a poor road surface, it can either cause the headlight range of the motor vehicle to be adjusted to a predetermined value or can cause the headlight range of the motor vehicle to be kept constant at a value which was set, for example, at the time of the positive decision recognizing a poor road surface.

Adjustment of the headlight range to a predetermined value upon recognition of a poor road surface may be obtained by actuation of the switching element 8 by the terrain recognition unit 24. For this, the switching element 8 is connected with a default unit 25, which feeds the switching element 8, for example, a value corresponding to the headlight range of the motor vehicle in a normal position. Usually an inclination of the motor vehicle without a load with a driver on a flat surface is considered a normal position of the motor vehicle. Upon appropriate actuation by the terrain recognition unit 24, the switching element 8 connects a value of the headlight range corresponding to the normal position of the motor vehicle predetermined by the default unit 25 through to the average calculator 9.

Keeping the headlight range constant can be effected by actuation of the switching element 12 by the terrain recognition unit 24. A time constant generated by a corresponding time constant generator 26 can be connected through to the average calculator 9 by such actuation. Freezing of the headlight range control then occurs for the duration of the time constant issued by the time constant generator 26 such that with appropriately large predetermined time constants the headlight range control is deactivated for a corresponding period of time, such that the headlight range remains constant.

In the arrangement of FIG. 1, according to the process described in the following, the terrain recognition unit 24 can make a decision as to whether a poor road surface is present or not.

At regular or speed-dependent time intervals, a difference between the two output signals of the front axle transmitter 1 and the rear axle transmitter 2 is calculated within the terrain recognition unit 24 and stored. A difference signal determined and stored immediately before that is subtracted from such a signal thusly calculated. The result of this subtraction is divided by a value which corresponds to a current wheel-rotation speed which is determined from the signal of the speed transmitter 3.

The signal obtained through this division is preferably filtered with a digital lowpass filter. The filtered signal is compared with a predetermined threshold value. If the measured-and-filtered signal exceeds the predetermined threshold value, a counter included in the terrain recognition unit 24 is set to a predetermined initial value. As long as this counter does not equal zero or a predetermined lower threshold value, the headlight range control is either deactivated by the terrain recognition unit 24 by actuation of the switching element 12 or the headlight range is adjusted to a predetermined value by actuation of the switching element 8.

When the signal developed by division and filtering drops below the threshold value, the counter included in the terrain recognition unit 24 is counted step-wise downwardly. The downward counting of the counter may either occur at constant time intervals in constant amounts. There is, however, also the possibility of taking the speed of the vehicle into account in the downward counting of the counter. This can, for example, occur in that at constant time intervals a value corresponding to speed of the vehicle is subtracted from the counter value, such that at higher speeds a more rapid downward counting of the counter occurs. When the value of the counter is 0 or below the predetermined threshold, the switching element 12 or the switching element 8 is controlled such that the headlight range control for normal road surfaces is reactivated.

Figure 2:
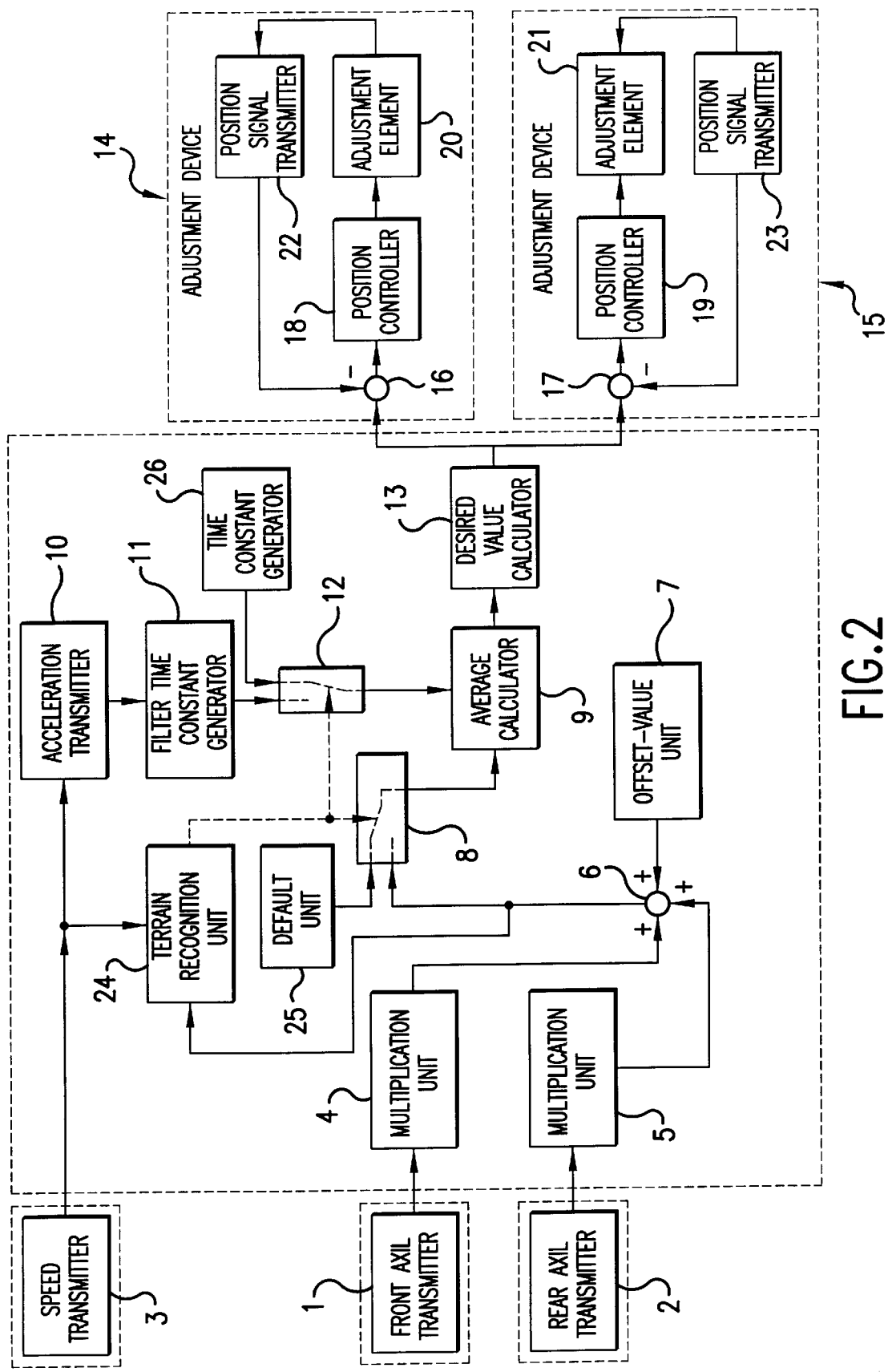
FIG. 2 a block circuit diagram of another embodiment of another device of this invention.

In the inventive device of the embodiment of FIG. 2, it is not the signals of the front axle transmitter 1 nor the rear axle transmitter 2 which are fed to the terrain recognition unit 24 along with the signal of the speed transmitter 3, but rather the output signal of the difference calculator 6. The output signal of the difference calculator 6 is stored in the terrain recognition unit 24 at constant or speed-dependent time intervals. The immediately preceding stored signal is subtracted from a current signal and, as in the embodiment according to FIG. 1, divided by a value which corresponds to the current rotation speed of the wheel. Then, the process continues as described above with reference to FIG. 1.

What is claimed is:

1. Process for automatically determining if a motor vehicle is traveling on a poor road surface and providing such determination in a form that can be used for controlling a headlight range of the motor vehicle, wherein signals are measured at a front axle and a rear axle representative of a relative position of a vehicle chassis of the motor vehicle to the respective front and rear axles, wherein a signal corresponding to the speed of the motor vehicle is further generated, wherein the signals measured at the front axle and at the rear axle as well as the signal corresponding to the speed of the motor vehicle are further processed for allowing recognition of presence of said poor road surface, said process including the following process steps:

a difference between the signals measured at a first point in time on the front axle and the rear axle is calculated and stored;

a difference between the signals measured at a second, later point in time on the front axle and the rear axle is calculated;

a difference between the two aforementioned differences is calculated;

a signal obtained in the preceding process step is divided by the signal corresponding to the speed of the motor vehicle;

the signal obtained by the division is compared with a predetermined threshold value;

if the signal obtained by the division exceeds the threshold value, the decision is made that the poor road surface is present.

2. Process according to claim 1 including the following process steps:

the signals measured on the front axle and the rear axle are in each case multiplied by a characteristic factor which takes into account the respective characteristics of sensors detecting the signals;

the difference between the signals measured at the first point in time on the front axle and the rear axle and multiplied by the respective characteristic factor is calculated and stored;

the difference between the signals measured at a second, later, point in time on the front axle and the rear axle and multiplied by the respective characteristic factor is calculated;

the difference between the two aforementioned differences is calculated;

the signal obtained in the preceding process step is divided by the signal corresponding to the speed of the motor vehicle;

the signal obtained by the division is compared with the predetermined threshold value;

if the signal obtained by this division exceeds the threshold value, the decision is made that the poor road surface is present.

3. Process according to claim 2, wherein in the calculation of the difference between the signals multiplied by the respective characteristic factors, an offset value is added such that an output signal thus obtained can be used as a desired-value signal for said headlight range control.

4. Process according to claim 1, wherein the process steps of difference calculation, division, and comparison with the predetermined threshold value are repeated at one of regular and speed-dependent time intervals.

5. Process for controlling the headlight range of the motor vehicle using the determination according to claim 1, wherein in the presence of a positive recognition of said poor road surface, the headlight range of the motor vehicle is adjusted to a predetermined value, which corresponds to a value in a normal position of the motor vehicle.

6. Process for controlling the headlight range of the motor vehicle using the determination according to claim 1, wherein in the presence of a positive recognition of said poor road surface, the headlight range of the motor vehicle is kept constant at the value present at the time of the recognition.

7. Process according to claim 1, wherein the signal obtained by division by the signal corresponding to the speed of the motor vehicle is filtered by a digital, lowpass filter before the comparison with the predetermined threshold value is made.

8. Process according to claim 1, wherein in the presence of a positive decision concerning recognition of said poor road surface, a counter is set to a predetermined initial value, and wherein after a negative decision concerning the recognition of said poor road surface by dropping below the predetermined threshold value, the counter set to the predetermined initial value is counted downwardly at predetermined time intervals, whereby the headlight range control remains deactivated as long as the counter has a value not equal to zero or greater than a predetermined lower threshold value.

9. Process according to claim 8, wherein the downward counting of the counter is speed-dependent such that with each counting procedure a value corresponding to the speed of the motor vehicle is subtracted from the value of the counter.

10. Device for the control of the headlight range of the motor vehicle using the determination obtained in the process according to claim 1, including a front axle transmitter (1) and a rear axle transmitter (2), which generate the signals representative of the relative position of the vehicle chassis of the motor vehicle to the respective front and rear axles wherein the device further includes adjustment devices (14, 15), for adjusting the headlight range of the motor vehicle in dependence on the signals from the front axle transmitter (1) and the rear axle transmitter (2), respectively, wherein the device further includes a speed transmitter (3) for outputting the signal corresponding to speed of the vehicle, and a terrain recognition unit (24) for determining, based on the signals of the front axle transmitter (1) and the rear axle transmitter (2) as well as that of the speed transmitter (3), whether the motor vehicle is moving on said poor road surface, with the terrain recognition unit (24) being connected with the front axle transmitter (1), the rear axle transmitter (2), and the speed transmitter (3), wherein the terrain recognition unit (24) calculates and stores a difference between the signals from the front axle transmitter (1) and the rear axle transmitter (2), wherein the terrain recognition unit (24) further subtracts a previously calculated difference in the signals from the front axle transmitter (1) and the rear axle transmitter (2) from a later difference in the signals from the front axle transmitter (1) and the rear axle transmitter (2), wherein the terrain recognition unit (24) further divides the signal obtained by the subtraction by the signal corresponding to the speed of the vehicle and compares the signal obtained by this division with the predetermined threshold value such that the terrain recognition unit (24) decides, when the threshold value is exceeded by the signal obtained by the aforementioned division, that said poor road surface is present.

11. Device according to claim 10, wherein the device further includes multiplication units (4, 5), which are connected to the front axle transmitter (1) and the rear axle transmitter (2) and multiplies output signals of the front axle transmitter (1) and the rear axle transmitter (2), in each case, by a characteristic factor which takes into account a respective characteristic of a sensor detecting the signal in the regions of the front axle and the rear axle, wherein the device further includes a difference calculator (6) for subtracting the signals issued by the multiplication units (4, 5), wherein the terrain recognition unit (24) is further connected with outputs of the speed transmitter (3) and of the difference calculator, wherein the terrain recognition unit (24) stores the output signals of the difference calculator (6) and subtracts a respective previously stored value of the output signal of the difference calculator (6) from a later value of the output signal of the difference calculator (6), wherein the terrain recognition unit (24) further divides the signal obtained by the subtraction by a signal corresponding to the speed of the vehicle and compares the signal obtained by this division with a predetermined threshold value, with the terrain recognition unit (24) deciding that said poor road surface is present when the threshold value is exceeded by the signal obtained by the aforementioned division.

12. Device according to claim 10, wherein the device further includes a switching element (12), by whose actuation by the terrain recognition unit (24) in the presence of a positive decision of recognition of said poor road surface the headlight range control can be deactivated.

13. Device according to claim 10, wherein the device further includes a switching element (8), by whose actuation by the terrain recognition unit (24) in the presence of a positive decision with regard to the recognition of said poor road surface the headlight range can be adjusted to a predetermined value, with the predetermined value corresponding to headlight range at a normal position of the motor vehicle.

14. Device according to claim 10, wherein the terrain recognition unit (24) includes a digital lowpass filter, with which the signal obtained by the division by the signal corresponding to the speed of the motor vehicle can be filtered before its comparison with the predetermined threshold value.

15. Device according to claim 10, wherein the terrain recognition unit (24) includes a counter, which can be set to a predetermined initial value in the event of a positive decision relative to the recognition of said poor road surface and counted downwardly in the event of a negative decision relative to the recognition of said poor road surface.

* * * * *